United States Patent
Scherzer et al.

(10) Patent No.: US 8,826,027 B2
(45) Date of Patent: *Sep. 2, 2014

(54) METHOD FOR PRODUCING ACKNOWLEDGED TRANSACTION DATA AND CORRESPONDING DEVICE

(75) Inventors: Helmut Scherzer, Tübingen (DE); Hans-Jürgen Roth, München (DE); Michael Baldischweiler, München (DE)

(73) Assignee: Giesecke & Devrient GmbH, Munich (DE)

( * ) Notice: Subject to any disclaimer, the term of this patent is extended or adjusted under 35 U.S.C. 154(b) by 6 days.

This patent is subject to a terminal disclaimer.

(21) Appl. No.: 13/567,336

(22) Filed: Aug. 6, 2012

(65) Prior Publication Data
US 2013/0042109 A1    Feb. 14, 2013

Related U.S. Application Data

(63) Continuation of application No. 12/531,111, filed as application No. PCT/EP2008/002061 on Mar. 14, 2008, now Pat. No. 8,239,683.

(30) Foreign Application Priority Data

Mar. 16, 2007  (DE) .......................... 10 2007 013 287

(51) Int. Cl.
*H04L 9/32*    (2006.01)

(52) U.S. Cl.
USPC ........................................................ 713/180

(58) Field of Classification Search
USPC .................................................. 713/180, 168
See application file for complete search history.

(56) References Cited

U.S. PATENT DOCUMENTS

| | | | |
|---|---|---|---|
| 5,701,342 A | 12/1997 | Anderson et al. | |
| 5,915,024 A | 6/1999 | Kitaori et al. | |
| 6,237,099 B1 | 5/2001 | Kurokawa | |
| 7,200,576 B2 | 4/2007 | Steeves et al. | |
| 7,917,761 B2 | 3/2011 | Cahill et al. | |
| 8,239,683 B2 * | 8/2012 | Scherzer et al. | ............... 713/180 |
| 2004/0174998 A1 | 9/2004 | Youatt et al. | |

FOREIGN PATENT DOCUMENTS

WO    00/73879 A1    12/2000

OTHER PUBLICATIONS

International Search Report in PCT/EP2008/002061, Feb. 26, 2009.

* cited by examiner

*Primary Examiner* — Dede Zecher
*Assistant Examiner* — Phuoc Tran
(74) *Attorney, Agent, or Firm* — Bacon & Thomas, PLLC

(57) ABSTRACT

A method and a display preparation unit are proposed for the execution of a transaction during which transaction data are processed which have to be confirmed by a user. The display preparation unit has a converter unit which converts transaction data to be interpreted into pixel values and displays them on a monitor, an interface of its own for directly attaching an input unit via which a user confirms displayed transaction data, as well as a crypto unit for generating a signature for a record of confirmed transaction data. In a variant the confirmation can be effected by the crypto unit generating and displaying a random number which has to be inputted by the user via a conventionally attached input unit.

20 Claims, 4 Drawing Sheets

METHOD FOR PRODUCING ACKNOWLEDGED TRANSACTION DATA AND CORRESPONDING DEVICE

CROSS REFERENCE TO RELATED APPLICATIONS

This application is a continuation of U.S. patent application Ser. No. 12/531,111 filed Sep. 14, 2009, which is the national stage of PCT/EP2008/002061 filed Mar. 14, 2008, and which further claims priority to German application 10 2007 013 287.7 filed Mar. 16, 2007, the contents of all of which are incorporated by reference herein in their entirety.

BACKGROUND

A. Field

The invention relates to the reliable and unattackable generation of confirmed transaction data when carrying out security-critical transactions using usual data processing devices in a basically attackable network environment. Among other things, the invention in particular is directed to the generation of secure transaction data when payments are carried out on a personal computer via the Internet.

B. Related Art

A special problem when carrying out security-critical applications, during which a user has to effect or confirm sensible data inputs, consists in ensuring that information reproduced on a screen corresponds to information actually intended by the user. Conventional computer systems, first of all personal computers, are attackable especially via the display on the screen by generating a display, for instance with the aid of a malware smuggled into the personal computer before, which pretends to the user that an application chosen by him is carried out properly, while, actually, a different application is executed with transaction data different from those desired by the user. Such attacks become possible, because when an application is executed in a personal computer typically the same CPU controls the data exchange to the background system, to the user input unit, and to the screen. Accordingly, via the connection to the background system it is comparatively easy to intervene in the data exchange with the user input unit and the screen.

For preventing such attacks it has already been proposed to use additional devices which at least temporarily establish a secure connection between user input unit and screen. Such a solution is known from the publication of the TOWITOKO company "Chip drive monitor kit macht digitale Signatur sicherer" 1999. According to it, between the CPU of the personal computer, input unit, and screen an additional device is connected with which, while temporarily disconnecting the CPU, a direct connection between user input unit and screen can be established. The additional device has for this purpose a display preparation unit of its own as well as a monitor switch by means of which via the additional device for the purpose of inputting sensitive transaction data a direct connection between user input unit and screen is temporarily established. A user then sees on the monitor the inputs actually effected by him at the input unit. The solution permits the trustworthy generation of confirmed transaction data, but since an additional device is required it is elaborate and accordingly expensive. Moreover, the set-up and removal times of the display associated with the switching processes when the monitor switch is actuated impair the user-friendliness.

From U.S. Pat. No. 5,701,342 A a method for generating trustworthy documents in an insecure computer environment is known, here with the aid of a filter is ensured that to the user is displayed the actual content of the document. A viewed document is secured with the aid of a seal. The security of the method first of all depends on the quality of the filter. Providing an efficient filter, however, is elaborate.

BRIEF SUMMARY OF THE DISCLOSURE

It is object of the invention to provide an arrangement which while having the same efficiency as the known arrangement can be produced cheaper and handled easier.

This object is achieved by a method having the features of the claim 1 as well as an apparatus having the features of the independent claim 12. The method according to the invention and the apparatus according to the invention are based on the approach that in a personal computer a security hardware is provided which ensures that none other than the user confirms a display represented on the monitor and, therefore, a transaction represented on the monitor can be triggered exclusively by an actual input of a user. Furthermore, the apparatus according to the invention ensures that only the content of an actually confirmed display is object of a transaction. By setting up a separate interface on the display preparation unit, which permits a user's inputs to be passed directly to the security hardware while bypassing the CPU, it is ensured that a display corresponds to what a user has inputted. In an alternative embodiment, the proof that a display corresponds to a user input is effected by means of a random number generated by the security hardware which is shown on the display and must be reproduced by the user. The apparatus according to the invention has the advantage that it does without any additional device. Instead, only small changes in the structure of a usual graphics card are required. This can be effected in particular very cost-effective. Display preparation units according to the invention can be standardly integrated or easily retrofitted in personal computers.

The handling of the apparatus according to the invention is also simplified. The method according to the invention is characterized in particular in that it does not require any special actions by a user when it is carried out. With the help of the direct physical connection of the user input unit to the display preparation unit, a user can easily convince himself at any time that inputs effected via the input unit reach the display preparation unit without the detour via the CPU of the personal computer. Thus, it becomes obvious that, in any case, attacks by malwares via the CPU are not possible. By the confirmation of the transaction data to be confirmed being effected on the graphics card without activating the CPU, it is, moreover, actually very reliably ensured that transaction data cannot be manipulated by malwares. Even when a malware should succeed in manipulating the graphics processor of the display preparation unit such that on the monitor a display appears which in an optical manner corresponds to one generated by a converter unit, a confirmation of the displayed data by a user would not have any consequences since the crypto unit in this case would still not find any signable data and therefore a signature would not be generated.

The second embodiment of the invention, according to which the confirmation of transaction data is effected by means of random information generated by the display preparation unit, in reaction to which the user has to input either again the displayed random information or its position on the monitor by means of an input unit, has the special advantage that an input unit attached in a usual manner can be used. An additional interface on the display preparation unit can be omitted.

Advantageously, the representation of the transaction data to be confirmed on the monitor is effected in a partial area of the display, while the remaining part of the display is shown in a normal manner according to the graphics data supplied by the CPU. So as to signalize to a user the intervention of the display preparation unit according to the invention, within the framework of the method according to the invention it is advantageously provided that after the graphics card having changed into the security mode, first, a preset start image is displayed which the user confirms.

Further advantageous developments and expedient embodiments can be found in the features of the dependent claims.

DESCRIPTION OF THE DRAWINGS

With reference to the Figure in the following an embodiment of the invention is described in more detail.

DETAILED DESCRIPTION OF PREFERRED EMBODIMENTS OF THE INVENTION

Figure 1:
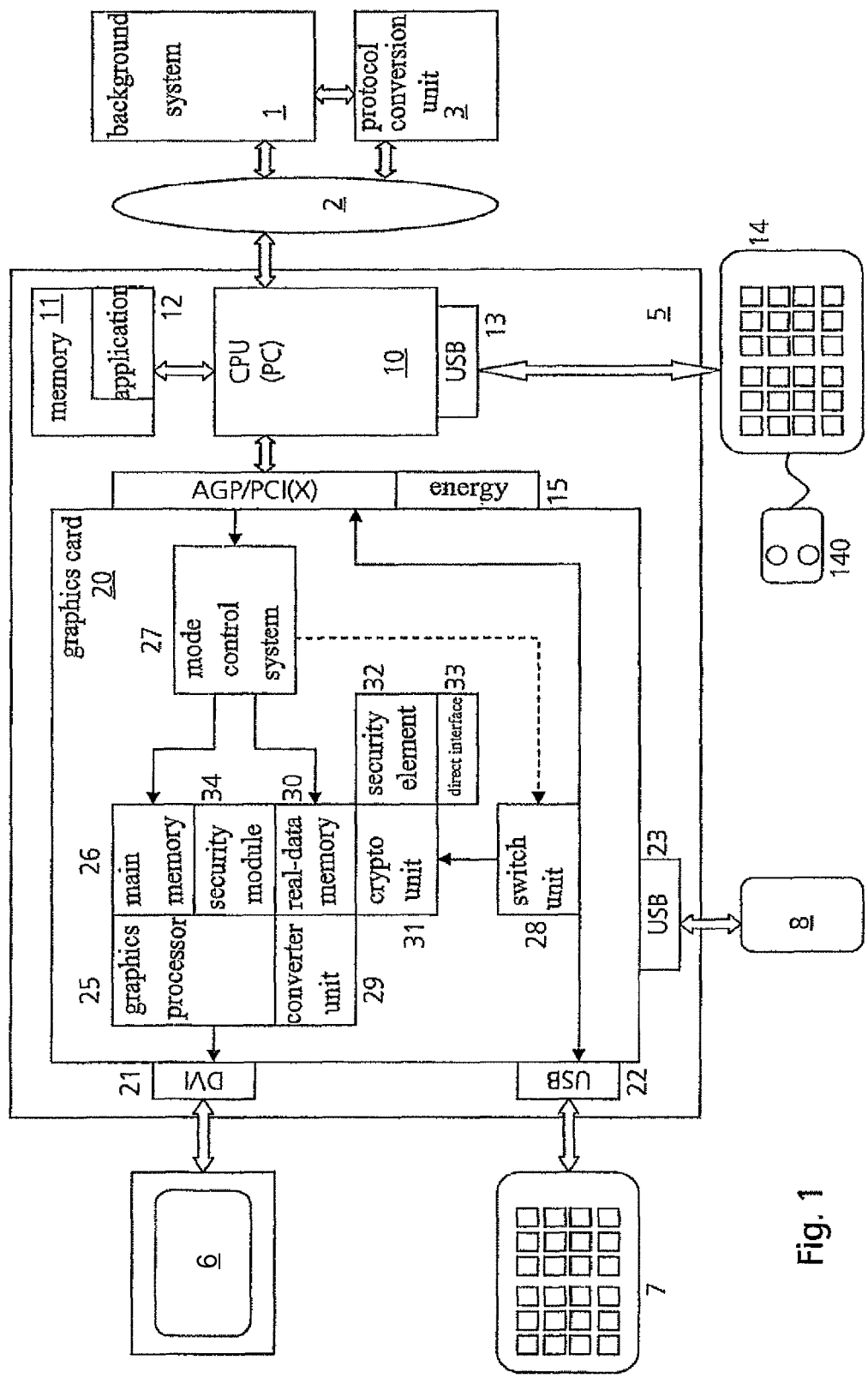
FIG. 1 shows in a block diagram the structure of a system for executing a security-critical transaction with a display preparation unit according to the invention.

The system shown in FIG. 1 basically consists of a background system 1, a data network 2, and a personal computer 5 which is connected with a monitor 6, an input unit 7, and/or an input unit 14 and an authentication unit 8.

The background system 1 provides services realized in software, which are retrievable by users via the data network 2 with the aid of in each case suitable application software, so as to carry out in each case service-specific transactions. Typical services are, for instance, carrying out bank transactions, carrying out credit card transactions, buying goods of all kinds via the Internet, or carrying out stock market transactions. During the retrieval of these services security-critical transactions are carried out, typically, cash movements are effected, identifications are made, or data that have to be paid are transferred.

The data network 2 enables the data exchange between a personal computer 5 and the background system 1. For realizing this task it can have intermediate units. In particular, protocol conversion units 3 can be provided which convert transaction data present in a protocol used on a personal computer 5 into a protocol adjusted to a background system 1.

The personal computer 5 basically has the structure of a usual computer and has all elements typical thereof; FIG. 1 shows those elements thereof which are important for the invention. Core element of the personal computer 5 is a central processor unit (CPU) 10 which is connected with a memory unit 11, via the data network 2 with the background system 1, as well as via a combined bus/energy interface 15 with a display preparation unit 20. In a second embodiment of the invention the personal computer can further be connected via an interface 13 with an input unit 14. The personal computer 5 typically has the constructional design of a desktop, a laptop or a terminal and is employed in the domestic area of a private person or in companies or public authorities.

The display preparation unit 20 is preferably formed as a separate circuit board assembly and accommodated within the housing of the personal computer 5 where it is connected via a bus/energy interface 15 with the CPU 10. Alternatively, the display preparation unit 20 can also be realized as a separate chip unit on the same circuit board as the CPU 10. The energy supply of the display preparation unit 20 is effected via the personal computer 5. Via a common external interface 21 the display preparation unit 20 is connected with the monitor 6. In addition, the display preparation unit 20 optionally has a further external interface 22 via which it is directly connected with a user input unit 7. Optionally, it can further have another external interface 23 for attaching an authentication unit 8. The authentication unit 8 in particular can be a transportable personal medium of a user, for instance in the form of a chip card or a USB token, but also a stationary unit, for instance a sensor for recording a biometric feature.

The memory unit 11 of the personal computer 5 is formed in a usual manner and in particular has a non-volatile area. Therein an application software 12 is stored for executing an application which permits the execution of a transaction with which a service offered via the background system 1 is used. The application software 12 can be a software permanently stored on the personal computer 5, for instance a software for taking part in "home banking" or a software which is only temporarily required for instance for the period of carrying out a transaction, as for instance a software for the management of log-in data for the acquisition of goods at an online seller. Typically, the application software 12 is not completely present in the memory unit 11 but only to such an extent as it is necessary for generating transaction data. Normally, therefore, the application software is restricted, first of all, to the provision of menus displayable on the monitor 6 for the input of transaction data. The application software 12 in the following is simply referred to as application.

The monitor 6 is of a usual type and serves for the image visualization of pixel graphics.

The input unit 7—and likewise the input unit 14—typically is a keyboard and or a mouse 140, but can also be a voice input apparatus or every other apparatus for effecting data inputs by a user. In a first embodiment of the invention described at first the personal computer 5 has an input unit 7 which is attached via the display preparation unit 20 to the personal computer 5. In a second embodiment the personal computer 5 has an input unit 14 directly acting on the CPU.

The authentication unit 8 can be for example a device for reading out chip cards, a device for checking fingerprints, an iris scanner, or the like.

The display preparation unit 20 is based on a usual graphics card and basically has all components typical thereof. In FIG. 1 only those components thereof are represented which are important in connection with the present invention. The representation of the components in the form of blocks here only serves for simplifying the description. The representation and description of the components as well as their connections are to be understood, first of all, logically. The structure represented in FIG. 1 need therefore by no means be found in reality in an actual circuit design of a display preparation unit. All components, while having the same functionality, rather can be formed in a physically different compilation and in particular in the form of software programs. For the description, in the following one starts out from the fact that the display preparation unit 20 is formed as a separate circuit board assembly.

The display preparation unit 20, in the following referred to as graphics card, is connected via the combined bus/energy interface 15 with the CPU 10. The bus/energy interface 15 for example is formed as an AGB/PCI (X) plug-in interface, so that the graphics card 20 readily can be separated from the CPU 10 and from the personal computer 5. Via the bus/energy interface 15 the graphics card 20 on the one hand exchanges data with the CPU 10 and on the other hand is supplied with energy, expediently via the central energy supply of the personal computer 5.

Main component of the graphics card 20 is—by definition—a graphics processor 25, which on the one hand via a main memory 26, a mode control system 27 and the bus/energy interface 15 is connected with the CPU 10, on the other hand via the monitor interface 21, which for example is formed as a DVI interface, is connected with the monitor 6. The graphics processor 25 generates from graphics data, which are loaded by the central processor unit 10 via the bus/energy interface 15 and the mode control system 27 into the main memory 26 and managed there, pixel graphics which are displayed on the monitor 6 as an image. The structure of the graphics card 20, as far as this is concerned, is usual.

Unlike usual graphics cards, the graphics card 20, however, according to the first embodiment of the invention, has an interface 22 of its own for attaching an input unit 7. The interface 22 is directly connected via a switch unit 28 with the bus/energy interface 15 to the CPU 10, so that in a first switching state of the switch unit 28 the inputs effected via the input unit 7 are directly passed to the CPU 10.

The graphics processor 25 is further connected with a converter module 29. The converter module 29 serves for converting data present in a markup language, for instance data present in the ASCII format or XML data, into pixel values which are displayed as a pixel graphic on the monitor 6. The pixel values generated by the converter module 29 are displayed on the monitor 6 preferably in a separate window which is overlayed on a present display generated from the data in the main memory 26.

The converter module 29 on its part is connected with a real-data memory 30. The real-data memory 30 serves for taking in transaction data to be interpreted. For receiving transaction data, the real-data memory 30 is connected with the mode control system 27. The real-data memory 30 is approachable only by the mode control system 27, the converter unit 29, and the crypto unit 31. A direct access via the bus/energy interface 15 in particular by the CPU 10 is not possible.

Furthermore, the real-data memory 30 is connected with a crypto unit 31. Its main function consists in calculating a signature with the help of the confirmed transaction data after a user has effected the confirmation of a display. For the user's acceptance of a confirmation the crypto unit 31 has a connection to the input unit 7 switchable by the switch unit 28.

The crypto unit 31 is further connected with a security element 32 which is allocated solely to the crypto unit 31 and approachable only by it, but in any case not directly by the CPU via the bus/energy interface 15. Expediently, the security element 32 can be especially protected against physical attacks. In the security element 32 on the one hand a preset start image for the monitor 6 is stored, whose reproduction on the monitor 6 signals to a user that the graphics card 20 is in the security mode. The start image, for example, can be a secret message defined by the user, a personal image, or a special icon. Preferably, it is only known to the authorized user and is determined or changed by him. Furthermore, in the security element 32 are located the user-specific personal data necessary for operating the crypto unit 31. This can be for example a PIN, a certificate, or a key for signing or for reloading an application. The preset start image, expediently, is selectively callable by means of a defined command and displayable on the monitor 6. The security element 32, expediently, further has a direct interface 33 of its own. Via this interface on the one hand there can be brought in new or further personal user data. On the other hand via the direct interface 33 the first personalization of the security element 32 can be effected. The security element 32 is expediently formed as a unit separable from the graphics card 20, for instance in the form of a chip card, so that the data stored in the security element 32 can be easily transferred to another graphics card when the graphics card 20 is exchanged.

The mode control system 27 accepts the data coming from the CPU 10 and evaluates them with regard to whether they are normal graphics data or transaction data to be interpreted resulting from the execution of an application. In the first case, the mode control system 27 passes the data to the main memory 26, in the second case to the real-data memory 30. On the basis of the data evaluation the mode control system 27 further effects that the graphics card 20 switches over to a security mode. For this purpose, it is connected with the switch unit 28 which in a first switching state connects the input unit 7 through to the bus/energy interface 15 and in a second switching state connects it with the crypto unit 31. The mode control system 27 e.g. can be realized by the transaction data to be interpreted containing a command for calling a specific interface (API CALL).

The graphics card 20 can be operated in two modes, a standard mode and a security mode. In the standard mode the graphics card 20 serves as a normal graphics card and displays graphics data supplied by the CPU 10 as images on the monitor 6. In the security mode the converter module 29 is active and the input unit 7 is directly connected via the switch unit 28 with the crypto unit 31. The converter unit 29 then generates a monitor display for a data record to be interpreted which is stored in the real-data memory 30, checks the receipt of a confirmation by the user, and subsequently signs the data record.

The components converter unit 29, real-data memory 30, crypto unit 31, security element 32 and/or switch unit 28, expediently, are technically formed as a connected assembly on the graphics card especially secured against manipulation. On the graphics card there can further be disposed a separate security module 34 formed as a hardware element which ensures a proper functionality of the components 25 to 32 of the graphics card by comparing important function parameters with reference parameters stored on the security module. The security module can only be accessed by designated entities, the access being strongly cryptographically secured. The security module in particular can have the form of a "trusted platform module (TPM)".

Setting up the graphics card 20 expediently is effected by the graphics card first being provided as a neutral graphics unit operable in the standard mode, the security mode only being prepared. Activating the security mode then is effected at a later time by a trustworthy entity via which the required functionality is brought into the neutral unit. In doing so, the entire software for operating converter unit 29, real-data memory 30, crypto unit 31 and/or security element 32 or at least substantial parts of it, for instance the security-critical and secret data, are transferred to the neutral graphics unit. For the transfer, to the trustworthy entity an end-to-end connection secured by means of suitable cryptographic techniques is established. Here, a key for establishing such a connection can have already been stored on the neutral graphics unit during the preparation of the security mode.

Figure 2:
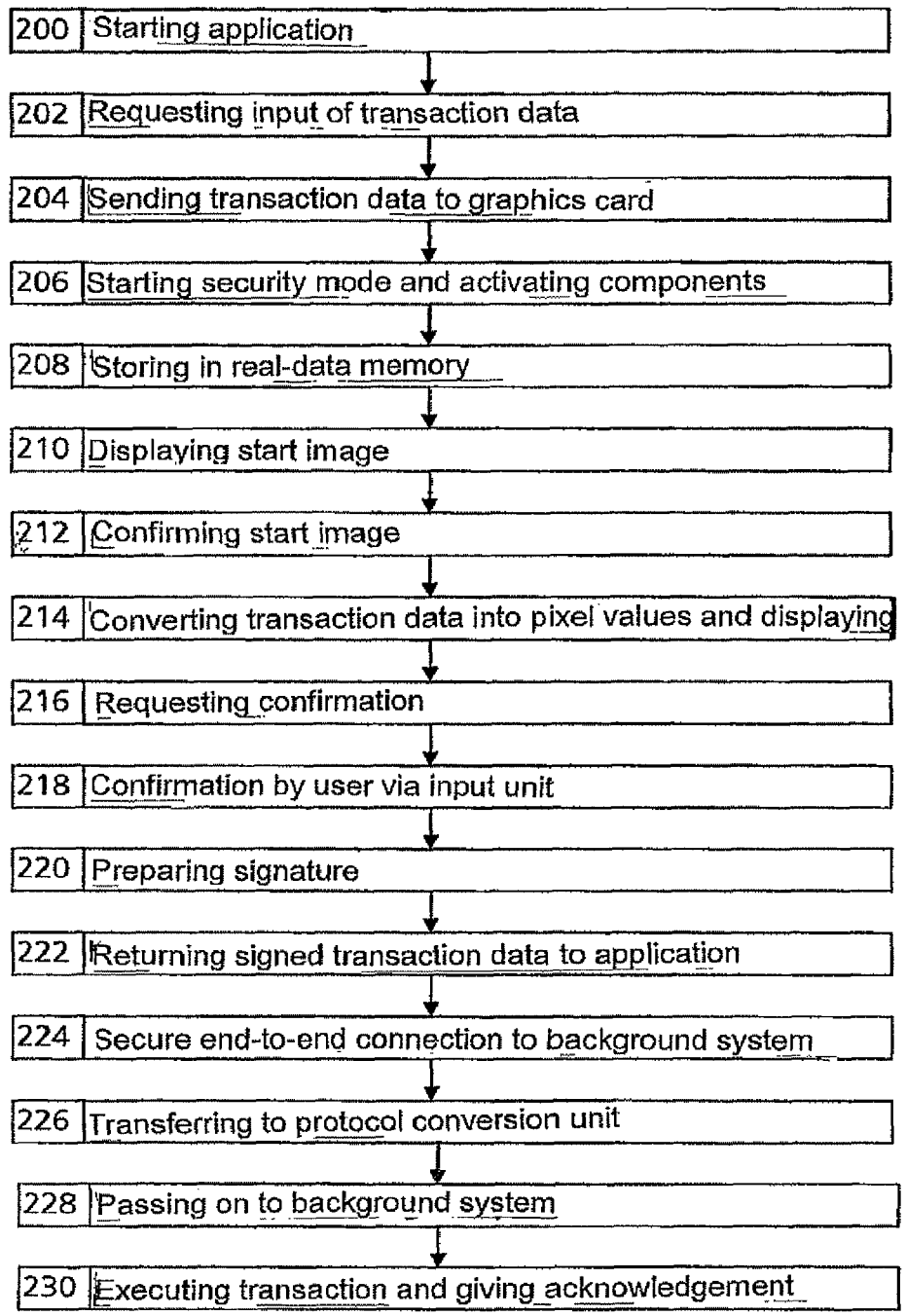
FIG. 2 shows a flow chart of the sequence of operations of an execution of a security-critical application on the system shown in FIG. 1.

With reference to the FIGS. 2 and 3 in the following the execution of a transaction on the basis of the system described before is explained by way of example. The example here starts out from the execution of a bank transaction, during which security-critical details relating to, among other things, account number and amount to be transferred are provided.

The execution starts by the user starting the associated application via the operating unit, step 200. The application guides the user in a known manner via appropriate menus represented on the monitor 6 through the application and prompts him to input transaction data, step 202. Transaction data can be, for example, as to be seen from FIG. 3: an account number, a bank identification number, an amount, a date, and a time. Certain details, such as date and time, here could have been generated by the application itself.

Figure 3:
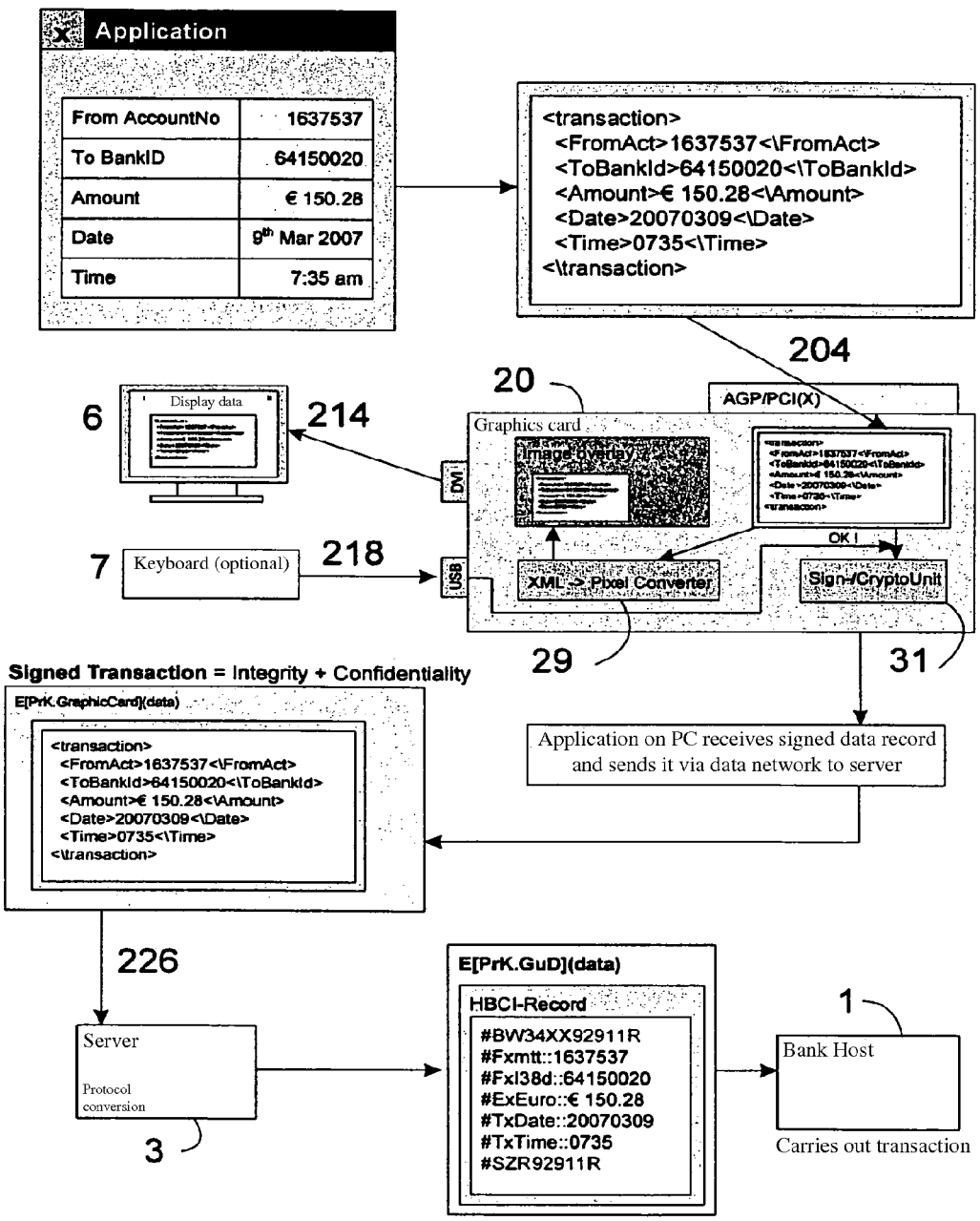
FIG. 3 shows an illustration of the sequence of operations of a transaction execution in a mixed representation with hardware components and operation steps.

The transaction data thereupon inputted by the user via the operating unit 7 are pre-processed by the CPU as a data record of markup data to be interpreted, for instance, as illustrated in FIG. 3, as XML data, and sent to the graphics card, step 204.

The data record incoming on the graphics card is recognized by the mode control system 27 as transaction data. The mode control system 27 thereupon effects the transition of the graphics card 20 into the security mode, step 206. For this purpose it activates converter module 29, crypto unit 31, and real-data memory 30 and causes the switch unit 28 to connect the input unit 7 with the crypto unit 31. It can further be provided that the graphics card 20 stops accepting further records of transaction data until the data record that came in first is confirmed.

The transaction data record is passed to the real-data memory by the mode control system 27, step 210.

Upon the activation of the security mode the crypto unit 31 accesses the security element 32 and displays the start image stored therein on the monitor 6, step 210. Preferably the display is effected in an "overlay" window, i.e. on top of the present display generated on the basis of the data in the main memory 26 a separate window is opened in a partial area of the monitor surface. Optionally, it can be provided that the user must confirm the start image via the input unit before the transaction data to be confirmed are displayed, step 212.

The converter module 29 then converts the transaction data to be interpreted stored in the real-data memory 30 into pixel values and displays these on the monitor 6 in the window opened before, step 214.

Together with the display of the transaction data, i.e. in the same window on the monitor, the user is prompted to confirm the transaction data. At the same time the switch unit 28 effects a connection of the input unit 7 with the crypto unit 31, step 216.

Now the user confirms the transaction data via the input unit 7 which due to the activation is directly connected with the crypto unit 31, step 218. The confirmation can take place by actuating one or more standard keys, but is expediently effected by the user effecting a sequence of inputs, where he, for example, repeats a part of the transaction data. Alternatively or complementary, the input of random information generated by the crypto unit 31 and displayed on the monitor 6 can also be provided, as it is explained below in more detail.

In an optional embodiment can further be provided, that during the confirmation the user effects an authentication via an authentication unit 8, for instance by presenting a chip card, an authentication token, or a fingerprint. In a variant, an authentication can also be effected by a data exchange between the crypto unit 31 and a security module of the personal computer 5 from which the crypto unit 31 receives for example a key.

The confirmation is recognized by the crypto unit 3 by it comparing for example transaction data inputted by the user via the input unit 7 with corresponding transaction data stored in the real-data memory 30. It thereupon takes from the security element 32 the key and/or the certificate provided therefor and generates therewith a signature over the transaction data stored in the real-data memory 30, step 220, e.g. by forming a hash value over the transaction data and subsequently encrypting the same. The signature is connected by the crypto unit 31 with the transaction data stored in the real-data memory 30 to form signed transaction data. If via the authentication unit 8 authentication information was inputted, it can be integrated in the formation of the signature.

The signed transaction data subsequently are transmitted by the crypto unit 31 via the bus/energy interface 15 back to the application 12, step 222.

The application 12 thereupon establishes, using known mechanisms, a secure end-to-end connection to the background system 1, step 224. In a variant can be provided that the graphics card 20 itself establishes the secure end-to-end connection.

In the following one starts out from the fact that the signed transaction data are present in a format which cannot directly be sent to a background system for realizing the bank transactions defined in the transaction data. Therefore, the application first transmits the signed transaction data to a protocol conversion unit 3, step 226, which converts the signed transaction data into a protocol in which they can be sent to a background system 1 for being processed. The protocol conversion unit 3 in doing so, expediently, at first checks the signature added by the crypto unit 31 and, provided that the signature has been checked to be approved, subsequently effects the necessary protocol reformatting. The transaction data then present in the protocol of the background system thereafter are transmitted by the conversion unit to the background system 1, step 228.

The background system 1 executes the transaction according to the transaction data. It can be provided that, subsequently, the background system 1 sends back an acknowledgement to the application 12, step 230. Sending back such an acknowledgement expediently is effected in the opposite direction using the same mechanisms as employed before for generating the signed transaction data. Accordingly, the acknowledgement is generated as a data record to be interpreted and provided with a signature, subsequently converted in the protocol conversion unit 3 into the format processable for the personal computer 5, after the graphics card 20 having switched into the security mode transferred to the crypto unit 31, there checked as to the correctness of the signature, displayed on the monitor 6 in a separate window, and confirmed by the user via the input unit 7.

In a second embodiment of the invention, the personal computer 5 has an input unit 14 connected via an interface 13 directly with the CPU 10. The graphics card 20 here has precisely the same structure as described with reference to the first embodiment, but has no interface 22, or to the interface 22 is no input unit 7 attached. The mode of functioning of the second embodiment also corresponds to that of the first embodiment, except for carrying out the confirmation of the transaction data after their display in step 214.

Contrary to the first embodiment, the confirmation of the transaction data displayed on the monitor 6 in step 214 is now effected by the crypto unit 31—in the security mode—generating logical information in the form of alphanumeric or symbolic random information, in particular a random number or a random word in the manner of a one-time password, and this being displayed via the converter unit 29 on the monitor 6. The display is effected in the same window as transaction data. At the same time the user is prompted by an accompanying display, in reaction to the displayed alphanumeric or symbolic random information, to input this random information via the input unit 14 connected with the CPU, step 216. Then the user inputs the alphanumeric or symbolic random information via the input unit 14 from where it reaches the CPU which passes it on via the bus/energy interface 15 to the crypto unit 31. There the random information received is compared with the displayed information. If there is a match, the crypto unit 31 will generate a signature, step 220. If, however, the crypto unit 31 determines a deviation, it will generate new alphanumeric or symbolic random information and displays it. Expediently, the number of failed attempts is limited. The random information inputted by the user can become part of the signature.

In a variant, which can also be employed as a supplement for generating and inputting alphanumeric random information, the confirmation of transaction data displayed on the monitor 6 is effected by the user inputting a unique combination of alphanumeric characters. The combination of characters here can be designed following the example of TANs (transaction numbers) and is presented to the user, typically, in the form of a hard copy list. A correctly inputted combination of digits in the security mode is represented as such on the monitor and thus confirms the transaction data.

Figure 4:
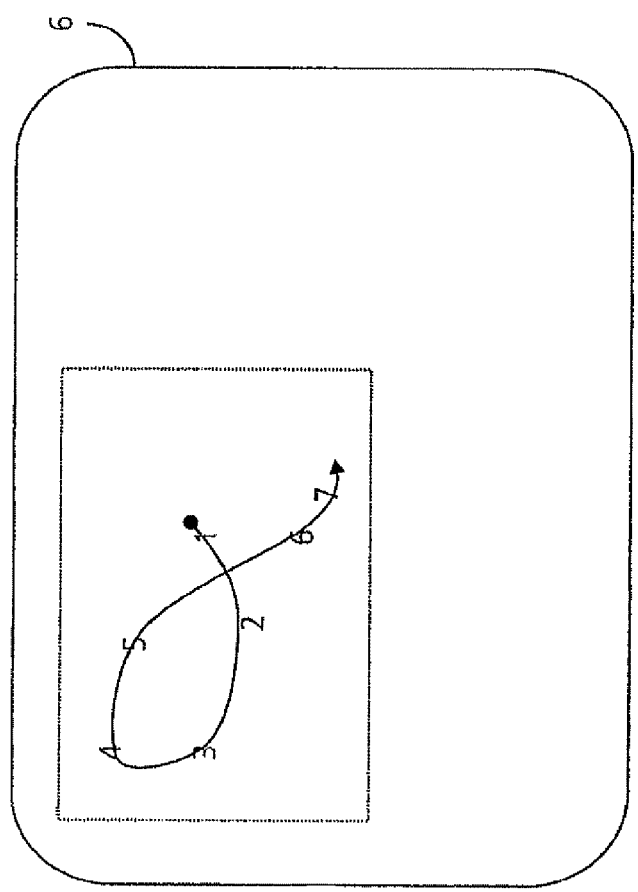
FIG. 4 shows a user input in reaction to the display of random information in the form of successive selection of a sequence of displayed digits.

In a further variant, illustrated in FIG. 4, for a user's input of a displayed random information can be provided that the crypto unit 31 in the security mode generates a sequence of logical pieces of information which it displays on the monitor 6 distributed over the entire or a partial area. The display can be effected, for example, as indicated in FIG. 4, in the form of a sequence of successive digits or as a sequence of letters for instance a word. The input unit 14 allows as an input the input of the position of information displayed on the monitor 6. Preferably, for this purpose it is provided with a mouse or another input satellite 140, which permits an input controlled via the position of a cursor on the monitor 6. The user now effects an input by means of the input satellite by selecting the displayed pieces of information in the given order so as to generate an input corresponding to the cursor position. For example, it can be provided that the user selects displayed digits according to their order. The crypto unit 31 checks whether the displayed pieces of information were selected in the correct order. The distribution of the digits and thus the sequence of positions to be inputted by the user is controlled at random and accordingly new with each call. Instead of digits or letters uniform symbols can also be used, which have to be connected with each other in a way uniformly determined beforehand or as outputted on the monitor 6, e.g. round to the left beginning at the top on the right. The way of the connection here can also be controlled at random itself and be displayed with the symbols. The variant illustrated in FIG. 4, besides, is also suitable, independent of the use within the above-described invention, as an independent solution for generating an input which can only be effected by a human user.

While completely maintaining the basic idea of designing a graphics card such that the confirmation of transaction data to be confirmed can be effected directly on the graphics card without involving the CPU of the personal computer, the above-described arrangement and the above-described method permit a multiplicity of variations. Thus, first of all the components described for the graphics card can be realized in multiple ways in hardware and software. Individual functions or procedure steps can be executed in others than the stated components or combined in one component; this for example applies to the converter unit 29 and the crypto unit 31 or the mode control system 27 and the switch unit. Similarly, of course, the data network or the background system can have elaborate structures, and in the execution of a transaction can be involved a plurality of personal computers or background systems. Of course, the solution according to the invention, besides, is also suitable for being used in transactions different from those explicitly mentioned.

The invention claimed is:

1. A method for generating confirmed transaction data by means of a personal computer having a monitor which is driven by a display preparation unit which from the CPU of the personal computer receives graphics data from which it generates pixel graphics, comprising the steps:
   providing a converter unit on the display preparation unit which is arranged to convert data to be interpreted into pixel values,
   providing a crypto unit on the display preparation unit for generating a signature for a record of data to be interpreted,
   providing a user input unit in order to pass user inputs to the crypto unit,
   starting an application in which transaction data are processed,
   pre-processing the transaction data as data to be interpreted on the personal computer under control of an application software,
   supplying the transaction data to be interpreted to the converter unit,
   converting the transaction data to be interpreted into pixel values by the converter unit,
   displaying the pixel values on the monitor,
   establishing a connection between a user input unit and the crypto unit through an interface of the display preparation unit or a connection between a user input unit and the crypto unit through the CPU of the personal computer, the connection allowing the input of a confirmation signal only by a user,
   inputting a confirmation signal by a user via a user input unit,
   generating a signature after the input of a confirmation signal by a user, and
   joining the signature and the transaction data into confirmed transaction data.

2. The method according to claim 1, comprising the following further steps:
   providing an interface for a user input unit on the display preparation unit in order to pass via this interface user inputs directly to the crypto unit, and
   establishing a direct connection between a user input unit and the crypto unit for the input of the confirmation signal by a user after the pixel values having been displayed on the monitor.

3. The method according to claim 1, wherein the confirmed transaction data are returned to the application executed by the application software.

4. The method according to claim 1, wherein the confirmed transaction data are sent to a protocol conversion unit which checks the signature and converts the transaction data into a protocol adjusted to a background system.

5. The method according to claim 1, wherein after the recognition of the receipt of the transaction data to be interpreted in the display preparation unit, a preset start image is displayed on the monitor.

6. The method according to claim 1, wherein the display of the pixel values is effected in a separate window which is overlayed on an existing display.

7. The method according to claim 1, wherein after the recognition of the receipt of the transaction data to be interpreted in the display preparation unit, for the time being, further transaction data to be interpreted are no longer accepted.

8. The method according to claim 1, wherein establishing the connection between user input unit and crypto unit is effected by the following steps:
   generating alphanumeric and/or symbolic random information on the display preparation unit and displaying the information on the monitor,
   requesting an input in reaction to the displayed alphanumeric or symbolic random information via the user input unit of the personal computer by a user, and
   comparing the displayed alphanumeric random information with that inputted by the user on the display preparation unit.

9. The method according to claim 8, wherein, in reaction to the displayed alphanumeric or symbolic random information, the input of the alphanumeric or symbolic random information displayed on the monitor via the user input unit is requested.

10. The method according to claim 8, wherein, in reaction to the displayed alphanumeric or symbolic random information, the input of the position of at least one piece of alphanumeric or symbolic random information on the monitor via the user input unit is requested.

11. The method according to claim 10, wherein the alphanumeric or symbolic random information comprises a sequence of numbers or letters whose positions on the monitor must be inputted in a preset order.

12. A display preparation unit for generating pixel graphics to be outputted on a monitor, comprising:
   an interface for accepting data from the CPU of a personal computer,
   an interface for transferring pixel graphics to a monitor,
   a mode control system for accepting data to be interpreted from the CPU of the personal computer,
   a converter unit which is arranged to convert data to be interpreted into pixel values, and
   a crypto unit for generating a signature for a record of data to be interpreted, the crypto unit arranged to receive a confirmation signal by a user from the CPU through the interface for accepting data from the CPU of the personal computer.

13. The unit according to claim 12, wherein a security element is allocated to the crypto unit for taking in user-specific information required for the preparation of a signature which has a direct interface via which further user-specific information can be brought in.

14. The unit according to claim 13, wherein the security element is arranged so as to be detachable from the display preparation unit.

15. The unit according to claim 12, wherein the crypto unit and the converter unit are accommodated in a manipulation-proof housing.

16. The unit according to claim 12, including a further interface for directly attaching an authentication unit.

17. The unit according to claim 12, wherein, for temporarily storing data to be interpreted, a real-data memory is provided which can only be accessed by the crypto unit, converter unit and mode control system, while, via the interface to the CPU, an access is not possible.

18. A display preparation unit for generating pixel graphics to be outputted on a monitor, comprising:
   an interface for accepting data from the CPU of a personal computer,
   an interface for transferring pixel graphics to a monitor,
   a mode control system for accepting data to be interpreted from the CPU of the personal computer,
   a converter unit arranged to convert data to be interpreted into pixel values, and
   a crypto unit arranged to generate alphanumeric random information and to compare the generated alphanumeric random information with alphanumeric random information inputted by a user supplied to the crypto unit by the CPU, as well as to further generate a signature for a record of data to be interpreted.

19. A system for executing a transaction within the framework of which transaction data are processed which have to be confirmed by a user according to the method of claim 1, comprising:
   a data network,
   a background system which provides services realized in software which are retrievable with the aid of an application software via the data network, and
   a personal computer with monitor and input unit which is arranged to execute an application software,
   wherein the personal computer comprises a display preparation unit for generating pixel graphics to be outputted on a monitor, comprising:
   an interface for accepting data from the CPU of a personal computer,
   an interface for transferring pixel graphics to a monitor,
   a mode control system for accepting data to be interpreted from the CPU of the personal computer,
   a converter unit which is arranged to convert data to be interpreted into pixel values, and
   a crypto unit for generating a signature for a record of data to be interpreted, the crypto unit arranged to receive a confirmation signal by a user from the CPU through the interface for accepting data from the CPU of the personal computer.

20. The unit according to claim 12, further comprising:
   an interface for attaching an input unit, and
   a switch unit actuated by the mode control system for connecting the input unit with the crypto unit through the interface for the input unit in order to enable a user to directly direct input information inputted by the user to the crypto unit.

* * * * *